(12) United States Patent
Rimback

(10) Patent No.: US 6,305,368 B1
(45) Date of Patent: Oct. 23, 2001

(54) ADJUSTABLE-LENGTH GRILL PLATE

(75) Inventor: Peter D. Rimback, Euclid, OH (US)

(73) Assignee: Hanover Direct, Inc., Weehawken, NJ (US)

( * ) Notice: Subject to any disclaimer, the term of this patent is extended or adjusted under 35 U.S.C. 154(b) by 0 days.

(21) Appl. No.: 09/745,158

(22) Filed: Dec. 20, 2000

Related U.S. Application Data

(60) Provisional application No. 60/201,013, filed on May 1, 2000.

(51) Int. Cl.$^7$ .................................................. A47J 37/00
(52) U.S. Cl. .......................... 126/25 R; 126/41 R; 99/447
(58) Field of Search ............................ 126/25 R, 41 R, 126/39 R, 9 R; 99/445–450

(56) References Cited

U.S. PATENT DOCUMENTS

| | | | |
|---|---|---|---|
| 4,561,419 | * 12/1985 | Koziel | 126/41 R |
| 4,899,724 | * 2/1990 | Kuechler | 126/41 R |
| 5,355,868 | * 10/1994 | Haen | 126/41 R |
| 5,437,221 | * 8/1995 | Schwod | 126/41 R |

* cited by examiner

Primary Examiner—James C. Yeung
(74) Attorney, Agent, or Firm—Thompson Hine LLP

(57) ABSTRACT

An adjustable-length flare-up preventing plate assembly for a barbecue grill includes at least two elongated metallic plates. Each elongated metallic plate includes a pair of longitudinal wings and at least one fastener, where the longitudinal wings are folded downwardly approximate a middle longitudinal centerline to form a concavity. The fastener is designed to couple at least two of the elongated metallic plates together in a longitudinal or over-lapping fashion, such that at least one of the plates will extend longitudinally from a longitudinal end of another one of the plates—providing an extended-length flare-up preventing plate. Once coupled together, this extended grill plate is placed into the barbecue grill concave-side-down so that the longitudinal ends of the extended grill plate rest against the tapered walls of the barbecue grill. Of course, it is preferred that pluralities of such extended grill plates are placed in the barbecue grill in a side-by-side fashion to provide an array of the extended grill plates below the cooking surface.

8 Claims, 4 Drawing Sheets

ADJUSTABLE-LENGTH GRILL PLATE

CROSS-REFERENCE TO RELATED APPLICATIONS

This application claims priority from U.S. Provisional Patent Application No. 60/201,013, filed May 1, 2000.

BACKGROUND

The present invention relates to plates used in a barbecue grill for preventing fire flare-ups; and more particularly, to such grill plates having adjustable lengths.

A prior art product known as the "Flare-Up Tamers," commercially available from Vance Industries, Inc., includes fixed-length, longitudinal metal plates that are folded longitudinally through the center-line thereof at an angle of approximately 120°. These plates are adapted to be placed concave-side-down in a side-by-side fashion along the "rock grate" of a barbecue grill (in place of the lava rock, volcanic rock or grill tiles commonly provided on the rock grate), which is in turn positioned over the gag burners. The grill plates arc adapted to become heated by the gas burners and vaporize the meat juices dripping down from the meat positioned on the cooking surface thereabove; thereby, reducing flare-ups caused by the ignition of such juices. Furthermore, some of the vapors produced by such vaporization of the meat juices will rise back into the food being cooked on the cooking surface; thereby, improving the flavor of such foods.

A disadvantage with the prior art grill plates is that not every natural gas or propane barbecue grill is made such that the burner unit is covered by a metal structure such as rock grate, which can receive the grill plates thereon. Accordingly, there is a need for a grill plate that can be used with barbecue grills that do not have grates positioned over the burners to seat the grill plates thereon.

SUMMARY

The present invention provides an adjustable-length grill plate assembly intended to prevent fire flare-ups in a barbecue grill. The ability to adjust the length allows the grill plate to be supported by the tapered walls of the gas grill if, for example, the grill does not include a rock grate.

Accordingly, one aspect of the present invention provides for an adjustable-length flare-up preventing plate for a barbecue grill comprising at least two elongated metallic plates. Each elongated metallic plate includes a pair of longitudinal wings and at least one fastener; where the longitudinal wings are folded downwardly approximate a middle longitudinal centerline to form a concavity. The fastener is designed to couple at least two of the elongated metallic plates together in a longitudinal or over-lapping fashion, such that at least one of the plates will extend longitudinally from a longitudinal end of another one of the plates—providing an extended grill plate. Once coupled together, this extended grill plate is placed into the barbecue grill concave-side-down so that the longitudinal ends of the, extended grill plate rest against the tapered walls of the barbecue grill. Of course, it is preferred that pluralities of such extended grill plates are placed in the barbecue grill in a side-by-side fashion to provide an array of the extended grill plates below the cooking surface.

Preferably, the longitudinal wings are folded downwardly from a flat longitudinal middle section extending along the longitudinal centerline of the grill plate, where this flat longitudinal middle section includes a plurality of the fasteners longitudinally distributed therealong to provide for a corresponding number of optional lengths for the extended grill plates. The FPS fasteners are preferably in the form of male and female fasteners. Such male and female fasteners are preferably formed by punching out a plurality of rectangular (preferably square) tabs into flat longitudinal middle section such that the rectangular tabs (male fasteners) extend substantially perpendicularly downward into the concave side of the plate, leaving a corresponding plurality of square holes (female fasteners) along the flat longitudinal middle section. With such fasteners, two over-lapping plates are coupled together by inserting the tabs of the top plate into the holes of the bottom plate.

Alternatively, the tabs could be punched outwardly, extending perpendicularly from the convex side of the plate. With such alternative fasteners, two over-lapping plates are coupled together by inserting the tabs of the bottom plate into the holes of the top plate.

It is a further aspect of the present invention to provide a plate for preventing fire flare-ups in a barbecue grill comprising an elongated metallic plate, the lateral ends of which are folded down at an angle along the length of the plate to provide a substantially concave surface and a substantially convex surface, the plate including a plurality of female fasteners uniformly distributed longitudinally across one of the concave and convex surfaces, and the plate further including a plurality of male fasteners uniformly distributed longitudinally across the other one of the concave and convex surfaces. Preferably, the plate is adapted to adjustably mate with an identical plate, by coupling at least some of the female fasteners of a first one of the plates with at least some of the male fasteners of the other one of the plates, to provide an adjustable-length grill plate.

Still another aspect of the present invention is to provide a method of adjusting the length of a flare-up preventing plate for a barbecue grill. The method comprises the steps of (a) overlapping at least two plates longitudinally with respect to one another; (b) extending the overlapping plates longitudinally outward with respect to each other until the plates reach a desired length; and (c) securing the overlapping plates together at the desired length. To obtain the desired length, it would be preferred that the grill plates be extended outwardly until the ends rest on the inside walls of the grill, Preferably, the method further comprises the step of (d) placing the adjusted grill plate such that each end rests on the inside walls of the grill. It would also be preferred that the method further comprises the steps of (e) repeating steps (a) through (d) for a plurality of grill plates, and (f) uniformly positioning the plurality of grill plates across a portion of the length or width of the grill in a side-by-side fashion.

An additional aspect of the present invention is to provide a method of fabricating a flare-up preventing plate for a barbecue grill. The method comprises the steps of (a) providing an elongated metallic plate; (b) folding the lateral ends of the elongated metallic plate downward from a middle longitudinal section at an angle along the length of the plate to provide a substantially concave surface and a substantially convex surface; and (c) punching out a plurality of rectangular preferably square) tabs along the middle longitudinal section so that they extend substantially perpendicularly into the concave portion of the plate, thereby leaving a corresponding plurality of rectangular holes along the middle longitudinal section. The tabs form a plurality of male fastening components and the holes forming a plurality of female fastening components. Therefore the plate is adapted to be coupled to another of the plates in an overlapping fashion by inserting the tabs of the top plate into the holes of the bottom plate, providing an adjustable-length flare-up preventing plate for a barbecue grill.

It is a further aspect of the present invention to provide an additional method of fabricating a flare-up preventing plate for a barbecue grill. The method comprises the steps of (a) providing an elongated metallic plate; (b) folding the lateral ends of the elongated metallic plate downward from a middle longitudinal section at an angle along the length of the plate to provide a substantially concave surface and a substantially convex surface; and (c) punching out a plurality of rectangular (preferably square) tabs along the middle longitudinal section such that the rectangular tabs extend substantially perpendicularly into the convex portion of the plate thereby leaving a plurality of holes along the middle longitudinal section. The tabs form a plurality of male fastening components and the holes form a plurality of female fastening components. Therefore the plate is adapted to be coupled to another of the plates in an overlapping fashion by inserting the tabs of the top plate into the holes of the bottom plate, providing an adjustable-length flare-up preventing plate for a barbecue grill.

DETAILED DESCRIPTION

Figure 1:
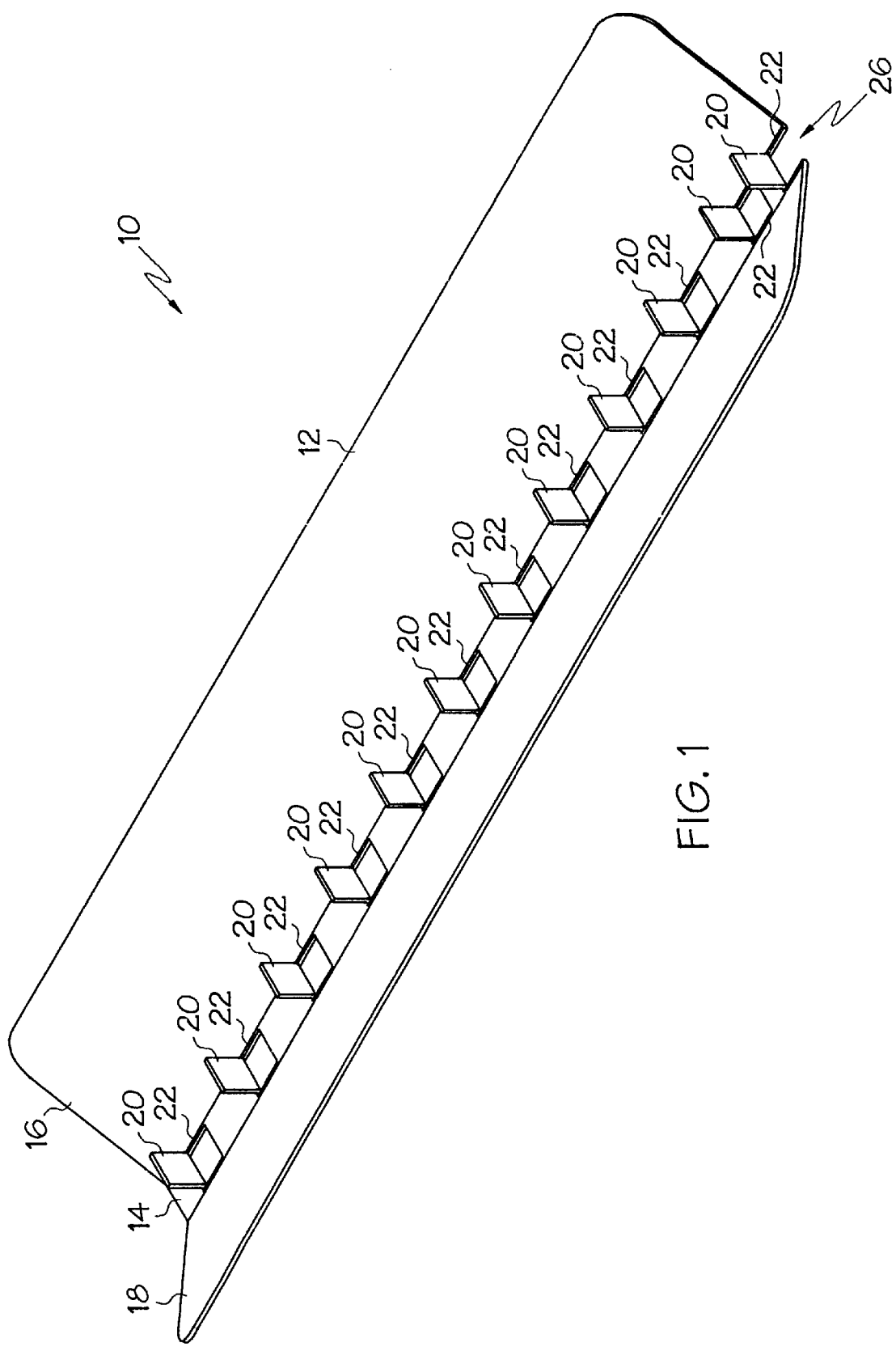
FIG. 1 is a perspective view of the concave portion of a grill plate according to a preferred embodiment of the present invention.

As shown in FIG. 1, a single one of the grill plate components 10 according to a preferred embodiment of the present invention includes a longitudinal plate 12 having a substantially flat and narrow, middle longitudinal section 14 and a pair of longitudinal wings 16, 18 folded downwardly from the middle longitudinal section 14 to provide a concavity. In the preferred embodiment, each of the wings 16, 18 are folded downwardly at approximately a 30° angle. The plate 12 also includes a plurality of male and female fastening components 20, 22 provided uniformly along the longitudinal middle section 14 of the plate. The male and female fastening components 20, 22 are preferably formed by punching out a plurality of rectangular (preferably square) tabs 20 in the longitudinal middle section 14 of the plate. Essentially, this is done by cutting each tab along three of the four sides thereof, and by bending each tab (along its remaining attached side) substantially perpendicularly into the concave side of the plate 12. Consequently, punching out such tabs 20 results in the presence of a corresponding plurality of square holes or cutouts 22 extending through the longitudinal middle portion of the plate. As will be described below, the tabs 20 provide male fasteners and the cutouts 22 provide female fasteners. It is also preferred that each of the plates have a notched end 26 provided by punching out a tab at a very longitudinal end of the plate. These notched ends, as will be described below, are used to assist the user to properly orient the preferred embodiment of the plates when coupling two of the plates together.

Figure 2:
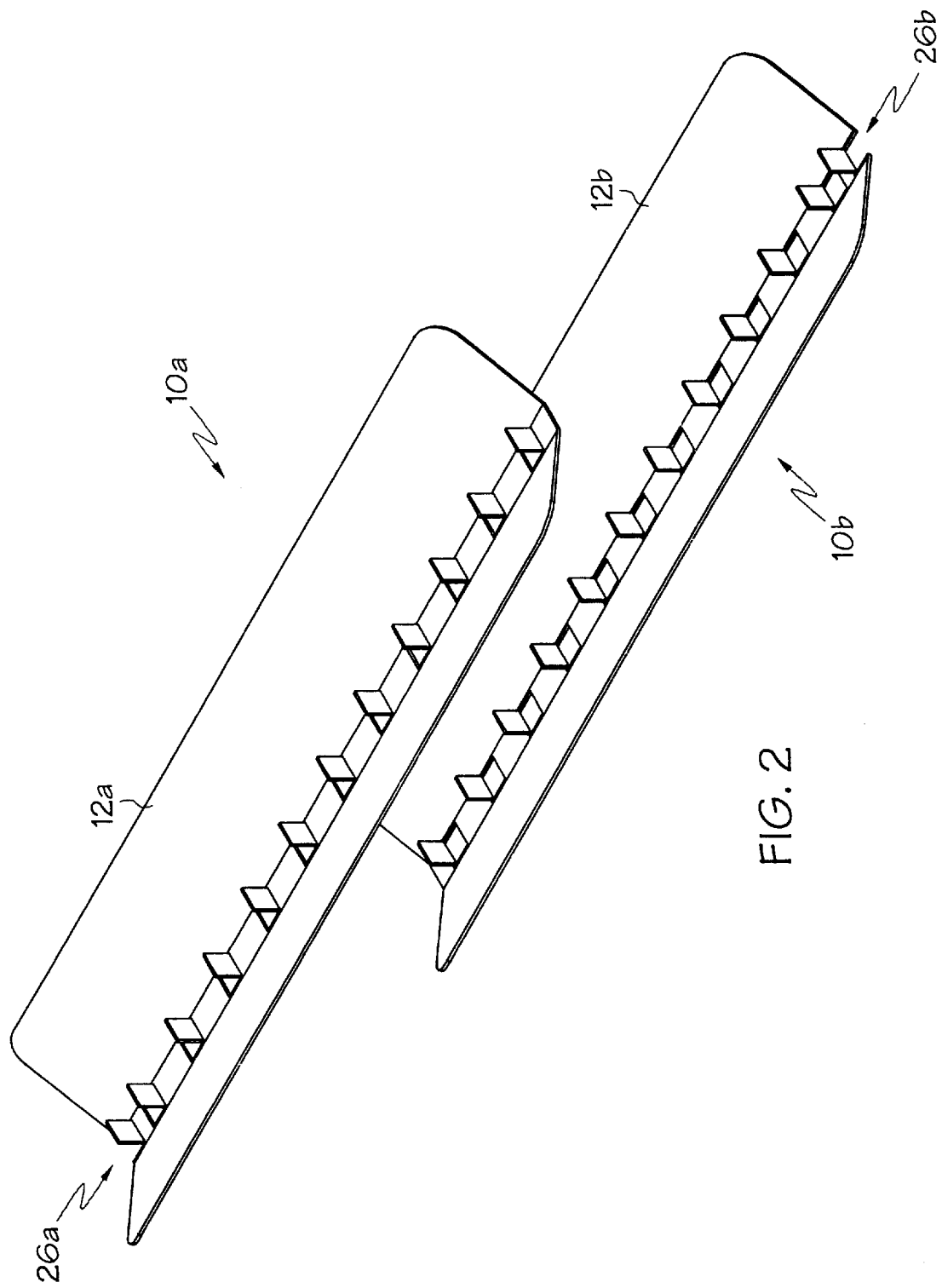
FIG. 2 is a perspective view of the concave portion of two of the grill plates prior to being assembled into an extended grill plate according to the preferred embodiment of the present invention.
Figure 3:
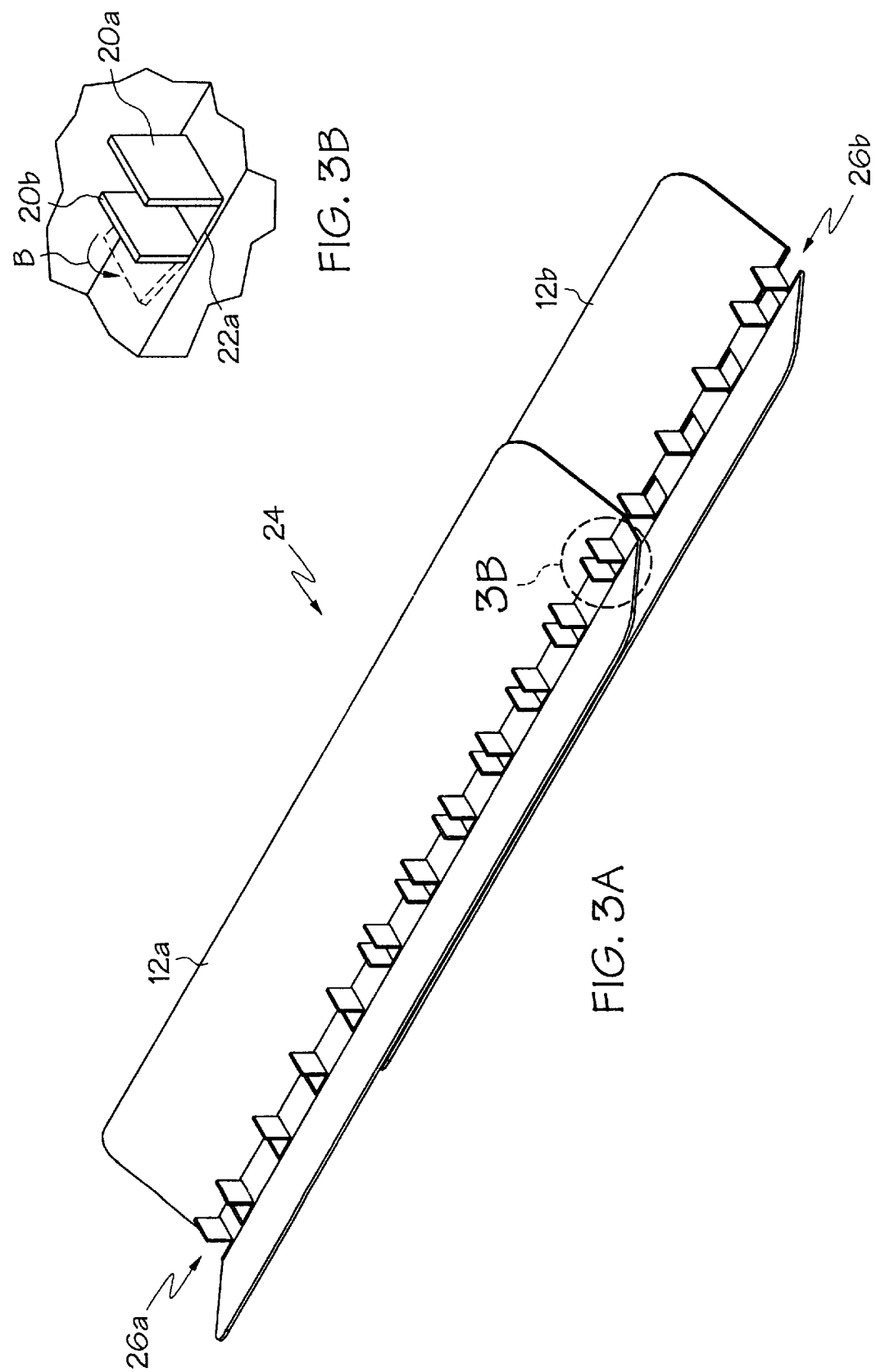
FIG. 3 is a perspective view of the concave portion of two the grill plates in the overlapping assembly position including an enlarged view of the fasteners used to couple the two plates according to the preferred embodiment of the present invention.
Figure 4:
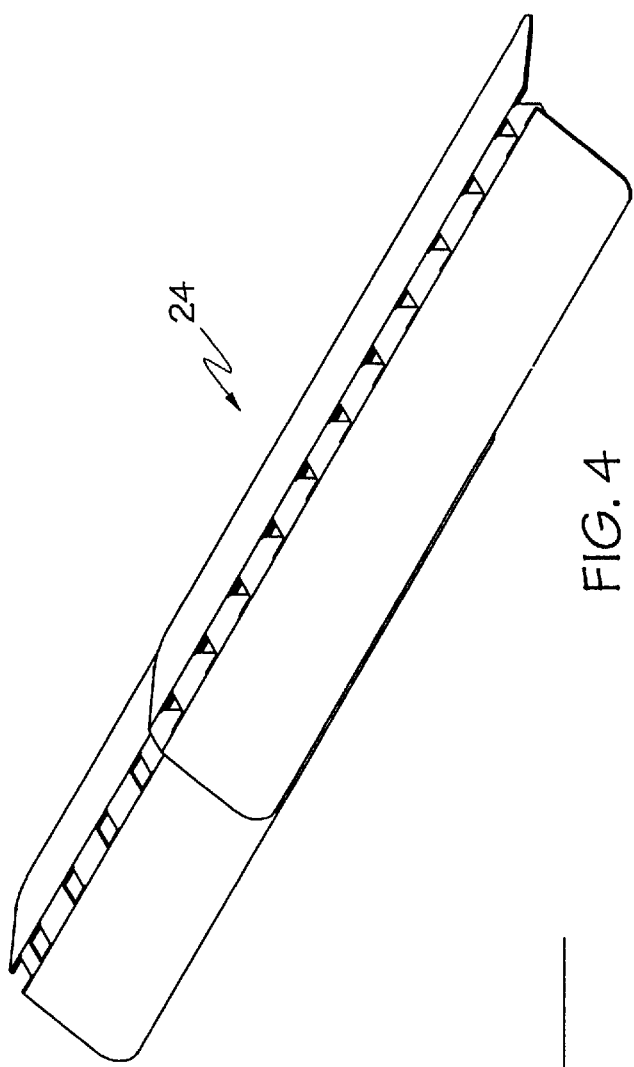
FIG. 4 is a perspective view of the convex portion of an assembled extended grill plate according to the preferred embodiment of the present invention.

As shown in FIGS. 2 and 3, the tabs and cutouts 20, 22 are used to couple a pair 12a, 12b of the plates together to provide an extended plate 24 having a desired length. To couple the two plates 12a, 12b together, the user will first arrange the lower plate 12a within the upper plate 12b such that the convex portion of the lower plate is positioned within the concave portion of the upper plate; and furthermore such that the notched ends 26a, 26b of both the lower and upper plates face outward. The outward position of the notches assures that the overlapping pieces will not slip apart once coupled.

Next, the user is to take the two grill plates and place them on the burner unit, concave side up (as shown in FIG. 2). With the plates overlapping each other, the user is to extend them outward until the ends rest on the inside walls of the grill. At a desired length, the tabs 20b of the upper plate (which is the lower plate in this measuring process) should protrude through the cutout 22a of the lower plate (See FIG. 3). Next, holding the two plates in position, the user will remove them from the grill and will then press the two plates together by hand, causing the tabs 20b in the overlapping portion of the upper plate 12b to extend through the cutouts 22a in the overlapping portion of the lower plate 12a until the two plates are snugly coupled together. Finally, preferably using a tool such as needle-nose pliers, the user will bend one or more of the inserted tabs 20b downward (such as shown by arrow B in FIG. 3) flat against the lower plate 10a. This optional step will help keep the assembly from falling apart due to heat expansion that will occur in use in the case where the assembly must form a self-supporting bridge across the tapered sides of a gas grill.

Figure 5:
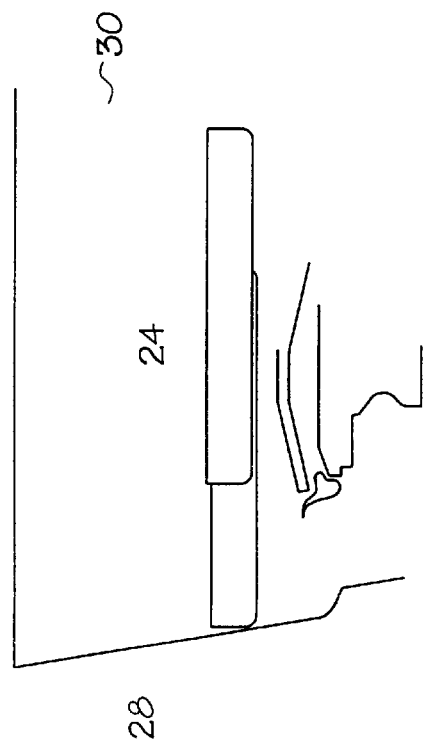
FIG. 5 is a cross-sectional side view of an assembled extended grill plate resting against two of the interior walls of a grill according to the preferred embodiment of the present invention.

Referring to FIG. 5, at this point, the extended plate 24 is ready to be placed in the grill, concave side down, such that its ends rest on the front and back walls 28, 30 of the grill 32. Preferably, a plurality of such plates 24 are distributed uniformly along the length of the grill, in a side-by-side arrangement; preferably, allowing about one-quarter inch space between the plates. Of course, closer or wider spacing may be used if desired.

It is also within the scope of the invention that the plates can be adjusted to have a length so that they span laterally between the side walls of the grill. It is also within the scope of the invention that more than two of the plates may be coupled together to provide an even longer extended plate.

In an exemplary embodiment, each grill plate 12 is made from unfinished 0.50-millimeter thick galvanized steel, having a length of approximately 8.40 inches and a width of approximately 2.76 inches, and including four rounded corners having 0.25-inch radii. At approximately 1.25 inches from each longitudinal side edge, the lateral wings 16, 18 of the plate are folded down at an angle of approximately 30° along the length of the plate to form a substantially concave surface having an interior angle of approximately 120°. Folding down the lateral wings 16, 18 in this manner create a flat middle longitudinal section 14 that is approximately 0.25-inch thick. The fasteners are provided by punching 0.25-inch$^2$ tabs 20 into the middle longitudinal section 14 and bending the tabs 20 into concave portion of the plate at a substantially 90° angle, leaving a substantially square cutout 22. The side of the tab 20 that is not cut is the side approximate the first longitudinal end of the plate. These tabs/cutouts 20, 22 begin at a distance of approximately 0.25-inch from a first longitudinal end and are spaced approximately 0.75-inch apart. Spacing the tabs/cutouts 20, 22 in this manner will yield eleven sets of tabs/cutouts. The positioning notch 26 is formed by punching a 0.25-inch$^2$ tab into the concave portion of the plate along the longitudinal middle section at the second longitudinal end.

While the invention has been described by reference to its preferred embodiment, it will be apparent to those of ordinary skill in the art that modifications may be made to the invention without departing from the scope of the invention as defined, at least in part, by the following claims.

What is claimed is:

1. An adjustable-length flare-up preventing plate assembly for a barbecue grill comprising at least two elongated plates, each elongated metallic plate including a pair of longitudinal wings and at least one fastener, wherein the fastener is designed to couple the elongated metallic plates together in a longitudinal fashion, wherein the longitudinal wings are angled downwardly from a middle longitudinal section to form a concave side and a convex side, wherein each elongated plate includes a plurality of the fasteners distributed longitudinally therealong, adapted to couple at least two of the elongated plates together longitudinally in a partially overlapping manner, wherein the plurality of fasteners include a plurality of female fastening components and a plurality of male fastening components, and wherein: the plurality of male fastening components include a plurality of projections extending from the concave side of the elongated plate; and the plurality of female fastening components include a plurality of holes extending through the elongated plate, each of which are sized to receive one of the projections from an overlapping one of the elongated plates.

2. The adjustable-length flare-up preventing plate assembly of claim 1, wherein the male and female fastening components are distributed along the middle longitudinal section of the elongated plate.

3. An adjustable-length flare-up preventing plate assembly for a barbecue grill comprising at least two elongated plates, each elongated metallic plate including a pair of longitudinal wings and at least one fastener, wherein the fastener is designed to couple the elongated metallic plates together in a longitudinal fashion, wherein the longitudinal wings are angled downwardly from a middle longitudinal section to form a concave side and a convex side, wherein each elongated plate includes a plurality of the fasteners distributed longitudinally therealong, adapted to couple at least two of the elongated plates together longitudinally in a partially overlapping manner, wherein the plurality of fasteners include a plurality of female fastening components and a plurality of male fastening components, and wherein: the plurality of female fastening components include a plurality of holes extending through the elongated plate; and the plurality of male fastening components include a plurality of projections extending from the convex side of the elongated plate, each of which are sized to be received within one of the holes in an overlapping one of the elongated plates.

4. A plate for preventing fire flare-ups in a barbecue grill comprising:

an elongated metallic plate, the longitudinal sides of which are angled with respect to a center portion of the plate to provide a substantially concave surface and a substantially convex surface, the elongated metallic plate including a plurality of female fasteners uniformly distributed longitudinally across one of the concave and convex surfaces, and the elongated metallic plate further including a plurality of male fasteners uniformly distributed longitudinally across the other one of the concave and convex surfaces, the uniform distribution of the male fasteners matching the uniform distribution of the male fasteners;

whereby the elongated metallic plate is adapted to adjustably mate with another one of the elongated metallic plates by at least partially overlapping a one of the elongated metallic plates over the other one of the elongated metallic plates and by coupling at least some of the female fasteners of one of the elongated metallic plates with at least some of the male fasteners of the other one of the elongated metallic plates.

5. The method of adjusting the length of a flare-up preventing plate for a barbecue grill, the method comprising the steps of:

(a) overlapping at least two plates longitudinally with respect to one another;

(b) extending the overlapping plates longitudinally outward or inward with respect to each other until the plates reach a desired length; and (c) securing the overlapping plates together at the desired length, wherein the securing step (c) includes the steps of:

(c1) cutting out three sides of a plurality of rectangular tabs along a middle longitudinal section of each plate and folding the rectangular tabs substantially perpendicularly into the concave portion of the plate thereby leaving a plurality of holes along the middle longitudinal section of the plate, the tabs forming a plurality of male fastening components and the holes forming a plurality of female fastening components; and (c2) inserting at least some of the rectangular tabs from an upper one of the overlapping plates into a corresponding number of holes in a lower one of the overlapping plates.

6. The method of claim 5, wherein the securing step (c) further includes the step of:

(c3) folding back at least one of the rectangular tabs of the upper one of the overlapping plates that is inserted into a hole in the lower one of the overlapping plates back against a lower surface of the lower one of the overlapping plates, thereby substantially locking the overlapping plates together.

7. The method of fabricating a flare-up preventing plate for a barbecue grill, the method comprising the steps of:

(a) providing an elongated metallic plate;

(b) folding the lateral ends of the elongated metallic plate downward at an angle from a middle longitudinal section along the length of the plate to provide a substantially concave surface and a substantially convex surface; and (c) cutting out three sides of a plurality of rectangular tabs along the middle longitudinal section of the elongated metallic plate and folding the rectangular tabs into the concave portion of the plate thereby leaving a plurality of holes along the middle longitudinal section, the tabs forming a plurality of male fastening components and the holes forming a plurality of female fastening components.

8. The method of fabricating a flare-up preventing plate for a barbecue grill, the method comprising the steps of:

(a) providing an elongated metallic plate;

(b) folding the lateral ends of the elongated metallic plate downward from a middle longitudinal section at an angle along the length of the plate to provide a substantially concave side and a substantially convex side; and (c) punching out a plurality of rectangular tabs along the middle longitudinal section such that the tabs extend substantially perpendicularly from the convex side of the plate, leaving a corresponding plurality of openings along the middle longitudinal section, the tabs forming a plurality of male fastening components and the openings forming a plurality of female fastening components.

* * * * *